July 1, 1930.  N. E. GOODRICH  1,769,566

MASSAGING MACHINE

Filed April 27, 1928   2 Sheets-Sheet 1

INVENTOR
Norris E. Goodrich
BY
Chappell Earl
ATTORNEYS

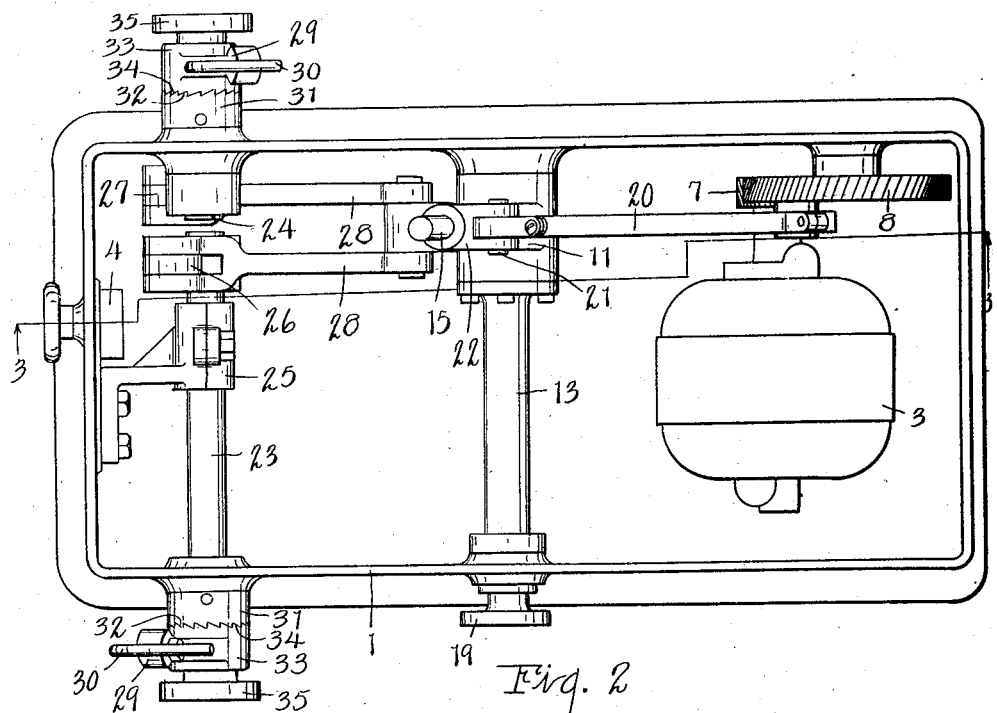
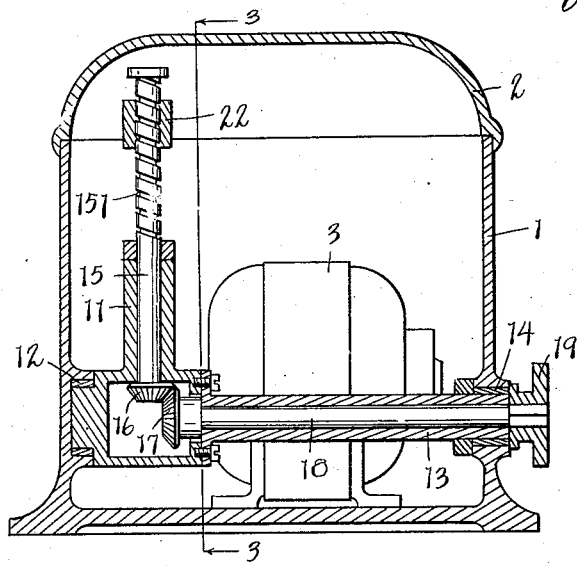
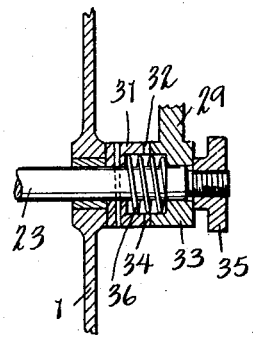

Patented July 1, 1930

1,769,566

UNITED STATES PATENT OFFICE

NORRIS E. GOODRICH, OF BATTLE CREEK, MICHIGAN, ASSIGNOR TO SANITARIUM EQUIPMENT COMPANY, OF BATTLE CREEK, MICHIGAN

MASSAGING MACHINE

Application filed April 27, 1928. Serial No. 273,244.

The main objects of this invention are:

First, to provide a massaging machine which is adapted for a wide range of uses and at the same time is very compact and simple in structure.

Second, to provide a massaging machine in which the stroke of the actuated members may be easily varied while the machine is in operation.

Third, to provide an improved massaging machine in which the driving mechanism is effectively housed.

Objects pertaining to details and economies of my invention will definitely appear from the description to follow. The invention is defined in the claims.

A structure embodying the features of my invention is clearly illustrated in the accompanying drawing, in which:

Fig. 2 is a plan view with the cover of the housing removed.

Fig. 4 is a transverse section on line 4—4 of Figs. 1 and 3, parts being shown in full lines for convenience in illustration.

Fig. 5 is a detail section on line 5—5 of Fig. 2.

Figure 1:
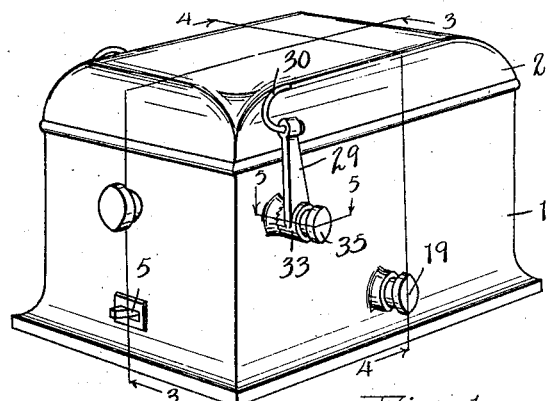
Fig. 1 is a perspective view of a structure embodying the features of my invention.
Figure 3:
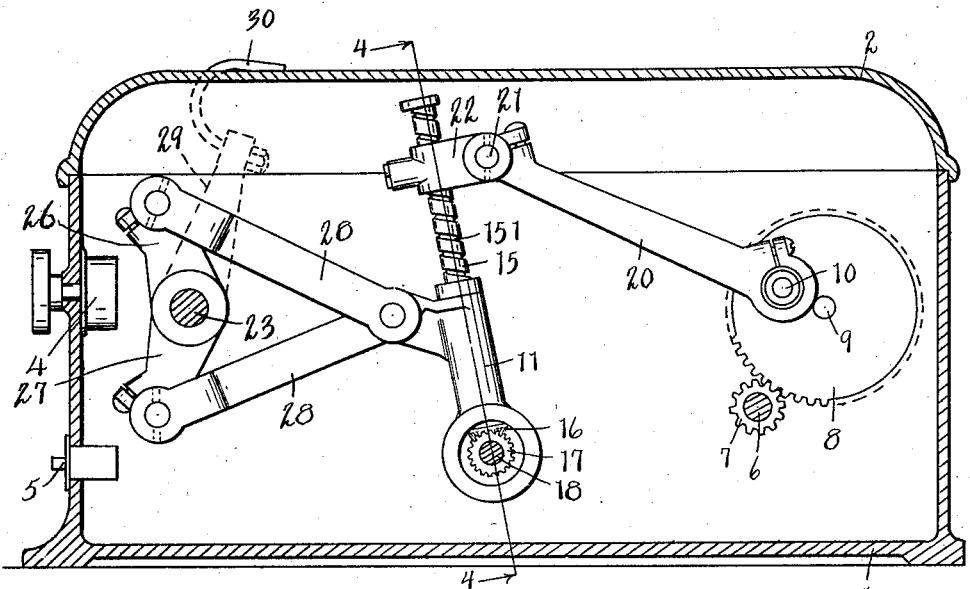
Fig. 3 is a vertical longitudinal section on line 3—3 of Fig. 2.

Referring to the drawing, the housing in the embodiment illustrated comprises a box-like body 1, which is preferably formed as an integral casting, and a cover 2, the operating parts being mounted within the body so that the cover may be removed without disturbing them.

Adjacent one end I mount an electric motor 3, preferably a variable speed motor, which is controlled from a rheostat shown conventionally at 4, the switch being indicated at 5. The wiring for the rheostat and switch to the motor is not illustrated as it is believed proper wiring will be understood by those skilled in the art.

The shaft 6 of the motor is provided with a pinion 7 which meshes with the teeth of a toothed crank disk 8. This crank disk 8 is mounted on a stub shaft 9 projecting from one of the side walls of the housing, the crank disk being provided with a crank or wrist pin 10.

I mount a rocking or oscillating crosshead 11 in a bearing 12 on one of the side walls, the crosshead having a tubular shaft 13 mounted in a bearing 14 in the opposite wall. Within this crosshead and forming a part thereof is a rotatable shaft 15 having screw threads 151 on its outer end. This screw or shaft has a beveled gear 16 on its inner end meshing with a gear 17 on the spindle 18 disposed within the tubular shaft 13 and having a finger piece 19 at its outer end on the outside of the casing. The pitman 20 is pivotally connected at 21 to the coupling 22 having threaded engagement with the screw 15. The crosshead is thus connected to the crank disk 8. By rotating the screw the stroke of the crosshead is adjusted.

In front of the crosshead I mount a pair of rockshafts 23 and 24 which are disposed in alinement and supported in bearings in opposite walls of the housing. A second bearing 25 is provided for the longer rockshaft 23. The rockshafts 23 and 24 have oppositely disposed arms 26 and 27, respectively, at their inner ends, and these arms are connected by the links 28 to the rocker crosshead 11 so that as the crosshead is oscillated through the connections with the motor as described, the rockshafts are oscillated in opposite directions.

On the outer ends of the rockshafts I mount the applicator engaging arms 29 provided with hooks 30 to which the applicators may be attached. I have not illustrated the applicators as these may be varied considerably in form. Suitable applicators are shown in the patent to Kellogg and Goodrich, No. 1,585,923 dated May 25, 1926.

To adapt the machine to a wider variety of uses, the arms 29 are adjustably secured to the rockshaft so that they may be swung to a horizontal position if desired, or to a vertical position, or in fact, to any intermediate position. To accomplish this the rockshafts are provided with collars 31 having toothed or serrated faces 32. The arms 29 have hubs 33 rotatable on the shaft and having teeth or serrations 34 coacting with the serrations of the collars. The nuts 35 are threaded upon the ends of the shaft to clamp the arms against the collars.

The collars and hubs of the arms in the embodiment illustrated are chambered to receive the coiled springs 36 which act to disengage the teeth when the nut is backed off, thereby facilitating adjustment of the arms.

I have illustrated and described my improvements in an embodiment which I consider very satisfactory. I have not attempted to illustrate or describe other embodiments or adaptations as it is believed that this disclosure will enable those skilled in the art to which the invention relates to embody or adapt my improvements as may be desired.

Having thus described my invention what I claim as new and desire to secure by Letters Patent is:

1. In a massaging machine, the combination of a housing, rockshafts projecting from said housing, arms on the outer ends of said rockshafts provided with applicator engaging means, said rockshafts being provided with oppositely disposed arms within said housing, a motor within said housing, a crank having driving connection with said motor, a rocker, links connecting said rocker to the said inner arms on said rockshafts whereby they are simultaneously actuated in opposite directions, a pitman connecting said rocker and crank, said pitman being connected to said rocker for adjustment longitudinally thereof whereby the stroke of the rocker may be varied, and means for effecting said adjustment from the outside of the housing.

2. In a massaging machine, the combination of a housing, a motor disposed within said housing, a crank disposed within said housing and having driving connections with said motor, a crosshead mounted within said housing, a pitman connecting said crank and crosshead, a pair of rockshafts disposed in alinement to project through the side walls of said housing, said rockshafts being provided with oppositely projecting arms, links connecting said arms to said crosshead whereby the rockshafts are simultaneously actuated in opposite directions, and applicator arms on the outer ends of said rockshafts.

3. In a massaging machine, the combination of a housing, a pair of rockshafts disposed in alinement to project through opposite walls of said housing, said rockshaft having oppositely disposed arms within said housing, applicator attaching arms on the outer ends of said rockshafts, a driving crank, a crosshead, a pitman connecting said crosshead to said crank, links connecting said crosshead to said oppositely disposed arms on said rockshafts, and means for adjusting the stroke of said arms from the outside of said housing.

4. In a massaging machine, the combination of a housing, a pair of rockshafts disposed in alinement to project through opposite walls of said housing, said rockshaft having oppositely disposed arms within said housing, applicator attaching arms on the outer ends of said rockshafts, a driving crank, a crosshead, a pitman connecting said crosshead to said crank, and links connecting said crosshead to said oppositely disposed arms on said rockshafts.

5. In a massaging machine, the combination of a housing, a driving crank arranged within said housing, a rockshaft projecting from said housing, an actuated member mounted on the outer end of said rockshaft, driving connections from said rockshaft to said crank disposed within said housing, and means for adjusting the stroke of said rockshaft from the outside of said housing.

6. In a massaging machine, the combination of a housing, a driving crank arranged within said housing, aligned rockshafts projecting from said housing, actuated members mounted on the outer ends of said rockshafts, and driving connections from said rockshafts, to said crank disposed within said housing and adapted to actuate said rockshafts simultaneously in opposite directions.

7. In a massaging machine, the combination of rockshafts provided with applicator engaging means and oppositely disposed arms, a driving crank, a rocker, links connecting said rocker to the arms on said rockshafts whereby they are simultaneously actuated in opposite directions, a pitman connecting said rocker and crank, said pitman being connected to said rocker for adjustment longitudinally thereof whereby the stroke of the rocker may be varied, and means for effecting said adjustment while the rocker is in motion.

8. In a massaging machine, the combination of rockshafts provided with applicator engaging means and oppositely disposed arms, a driving crank, a rocker, links connecting said rocker to the arms on said rockshafts whereby they are simultaneously actuated in opposite directions, and a pitman connecting said rocker and crank.

9. In a massaging machine, the combination of a housing, a driven crank within said housing, a pair of aligned rockshafts projecting from said housing and provided with applicator engaging members on their outer ends and opositely disposed arms within said housing, a crosshead, links connecting said opositely disposed arms to said crosshead, and a pitman connecting said crosshead to said crank.

10. In a massaging machine, the combination of a pair of rockshafts disposed in alinement and having oppositely projecting arms, a pivotally mounted crosshead, links connecting said crosshead to said arms, a screw disposed longitudinally of said crosshead and provided with a beveled gear at its inner end, an adjusting spindle disposed axially of said crosshead pivot and provided with a beveled gear coacting with said gear on said screw, a crank, a pitman provided with an adjustable coupling coacting with said screw whereby the stroke of the crosshead may be varied, and actuated members on said rockshafts.

11. In a massaging machine, the combination of a rockshaft provided with an arm, an actuated member on said rockshaft, a driving crank, a pivotally mounted crosshead, a link connecting said crosshead to said arm on said rockshaft, a screw rotatably mounted in said crosshead and provided with a beveled gear at its inner end, a spindle disposed axially of the pivot of said crosshead and provided with a beveled pinion coacting with said pinion on said screw, a coupling having threaded engagement with said screw, and a pitman connecting said coupling and crank.

12. In a massaging machine, the combination of a housing, rockshafts disposed in alinement to project from opposite walls of said housing, said rockshafts being provided with oppositely disposed arms within said housing, actuated members on the outer ends of said rockshafts, a driving crank within said housing, a crosshead pivotally mounted within said housing, links connecting said crosshead to said inner arms on said rockshafts, a screw rotatably mounted in said crosshead, means for actuating said screw from the outside of said housing, a coupling having threaded engagement with said screw, and a link connecting said coupling and crank.

13. In a massaging machine, the combination of rockshafts disposed in alinement and provided with oppositely disposed arms, actuated members on said rockshafts, a driven crank within said housing, a pivotally mounted crosshead, links connecting said crosshead to said arms on said rockshafts, a screw rotatably mounted in said crosshead, means for actuating said screw, a coupling having threaded engagement with said screw, and a link connecting said coupling and crank.

14. In a structure of the class described, the combination of a pair of rockshafts disposed in alinement, means for simultaneously actuating said rockshafts in opposite directions, and arms adjustably mounted on said rockshafts whereby they may be rotatably adjusted thereon and secured in their adjusted positions, said arms being provided with applicator engaging means.

15. In a massaging machine, the combination of a pair of rockshafts disposed in alinement, means for simultaneously oscillating said rockshafts in opposite directions, and actuated arms mounted on said rockshafts for rotative adjustment thereon, said arms being provided with curved applicator engaging hooks.

16. In a massaging machine, the combination of a housing, a motor disposed within said housing, rockshafts disposed in alinement to project from the sides of said housing and provided with oppositely disposed arms on their inner ends, a motor within said housing, driving connections for said motor to said arms whereby said rockshafts are simultaneously oscillated in opposite directions, and actuated arms mounted on said rockshafts on the outside of said housing provided with applicator engaging members.

In witness whereof I have hereunto set my hand.

NORRIS E. GOODRICH.